United States Patent
Camble et al.

(10) Patent No.: US 6,845,431 B2
(45) Date of Patent: Jan. 18, 2005

(54) SYSTEM AND METHOD FOR INTERMEDIATING COMMUNICATION WITH A MOVEABLE MEDIA LIBRARY UTILIZING A PLURALITY OF PARTITIONS

(75) Inventors: Peter Thomas Camble, Bristol (GB); Stephen Gold, Bristol (GB); Daryl Stolte, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 125 days.

(21) Appl. No.: 10/034,580

(22) Filed: Dec. 28, 2001

(65) Prior Publication Data

US 2003/0123274 A1 Jul. 3, 2003

(51) Int. Cl.[7] .............................................. G06E 12/00
(52) U.S. Cl. ...................................... 711/152; 711/153
(58) Field of Search ............................ 711/5, 152, 153, 711/154; 710/8

(56) References Cited

U.S. PATENT DOCUMENTS

| | | | |
|---|---|---|---|
| 5,164,909 A | 11/1992 | Leonhardt et al. ........... 711/114 |
| 5,367,669 A | 11/1994 | Holland et al. | |
| 5,416,914 A | 5/1995 | Korngiebel et al. ........ 700/215 |
| 5,734,859 A | 3/1998 | Yorimitsu et al. | |
| 5,805,864 A | 9/1998 | Carlson et al. .............. 711/112 |
| 5,835,940 A | 11/1998 | Yorimitsu et al. | |
| 5,867,736 A | * | 2/1999 | Jantz .............................. 710/8 |
| 5,890,014 A | * | 3/1999 | Long .............................. 710/8 |
| 5,970,030 A | 10/1999 | Dimitri et al. ............... 711/161 |
| 6,038,490 A | 3/2000 | Dimitri et al. ............... 700/214 |
| 6,044,442 A | * | 3/2000 | Jesionowski ................. 711/153 |
| 6,085,123 A | 7/2000 | Baca et al. .................. 700/214 |
| 6,295,578 B1 | * | 9/2001 | Dimitroff et al. ........... 711/154 |
| 6,336,172 B1 | 1/2002 | Day, III et al. ........... 369/30.46 |
| 6,421,711 B1 | * | 7/2002 | Blumenau et al. ........... 711/153 |
| 6,425,059 B1 | * | 7/2002 | Basham et al. .............. 711/153 |
| 6,507,896 B2 | * | 1/2003 | Sanada et al. ............... 711/153 |
| 6,519,678 B1 | 2/2003 | Basham et al. ................ 703/24 |
| 6,535,964 B2 | * | 3/2003 | Sanada et al. ............... 711/152 |

FOREIGN PATENT DOCUMENTS

| | | |
|---|---|---|
| EP | 0859308 | 8/1998 |
| EP | 1156408 | 11/2001 |
| JP | 09185465 | 7/1997 |
| JP | 10269026 | 10/1998 |
| JP | 2001014257 | 1/2001 |

OTHER PUBLICATIONS

"Sharing Backup Resources," Ralph Cuellar; Apr. 2000.
"The Gator Tape Library Family Architecture," John Kranz; Oct. 1999.
"Fibre Channel Fundamentals," Tom Weimer.

(List continued on next page.)

Primary Examiner—Trong Phan

(57) ABSTRACT

In an embodiment, the present invention is directed to a system for intermediating communication, with a moveable media library, utilizing partitions, wherein the moveable media library comprises an internal controller that is, in part, operable to control a robotics subsystem in response to commands received via a control interface. Such a system comprises: a bridge unit that is operable to pass library commands to an external controller, wherein the bridge unit is operable to associate a plurality of logic units (LUNs) with the external controller. The external controller is operable to process library commands from the bridge unit, wherein the external controller associates each partition of a plurality of partitions with a respective LUN of the plurality of LUNs, and the external controller is further operable to translate received commands from the bridge unit for communication to the internal controller according to the plurality of partitions.

21 Claims, 3 Drawing Sheets

OTHER PUBLICATIONS

"Spectra 12000 User Guide," Sep. 2000.
Foreign Search Report dated Feb. 13, 2003.
IBM Technical Disclosure Bulletin, "Optical Disk Drive Loader for Work Station with Pluggable Magazine", vol. 38, No. 12, Dec. 1955, pp. 243–246.
IBM Technical Disclosure Bulletin, "Logical Grouping of Data Storage Media in a Library System", vol. 35, No. 5, Oct. 1992 –pp. 17–20.
Massiglia, P., "The Raid Book", 6th edition, Feb. 1997, 83 pages.

* cited by examiner

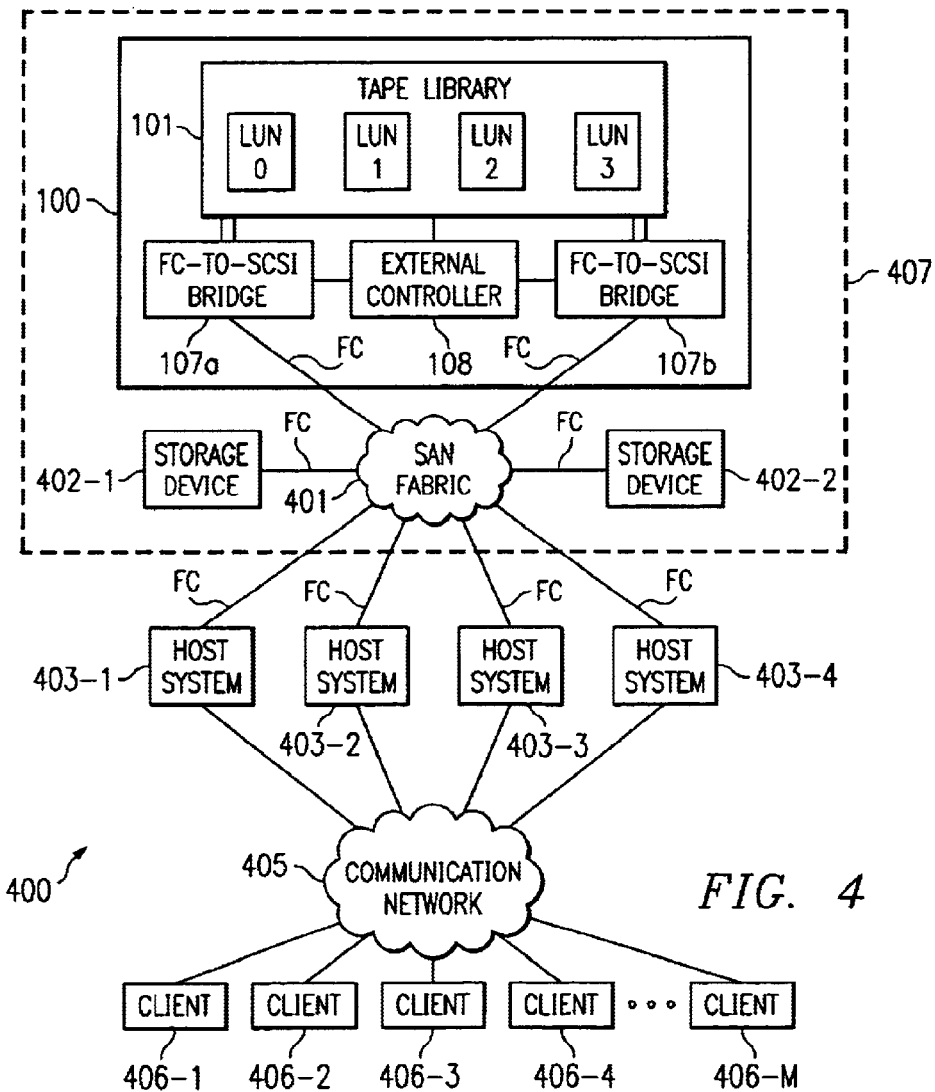

SYSTEM AND METHOD FOR INTERMEDIATING COMMUNICATION WITH A MOVEABLE MEDIA LIBRARY UTILIZING A PLURALITY OF PARTITIONS

CROSS-REFERENCE TO RELATED APPLICATIONS

The present invention is related to the following copending and commonly assigned U.S. patent applications: Ser. No. 10/033,003 entitled Method for Using Partitioning to Provide Capacity on Demand in Data Libraries, filed Dec. 28, 2001; Ser. No. 10/033,010 entitled System and Method for Securing Fiber Channel Drive Access in a Partitioned Data Library, filed Dec. 28, 2001; Ser. No. 10/034,888 entitled System and Method for Securing Drive Access to Data Storage Media Based On Medium Identifiers, filed Dec. 28, 2001; Ser. No. 10/034,518 entitled System and Method for Securing Drive Access to Media Based On Medium Identification Numbers, filed Dec. 28, 2001; Ser. No. 10/032,923 entitled System and Method for Peripheral Device Virtual Functionality Overlay, filed Dec. 28, 2001; Ser. No. 10/032,662 entitled System and Method for Managing Access to Multiple Devices in a Partitioned Data Library, filed Dec. 28, 2001; Ser. No. 10/033,009 entitled System and Method for Partitioning A Storage Area Network Associated Data Library Employing Element Addresses, filed Dec. 28, 2001; Ser. No. 10/034,691 entitled System and Method for Partitioning a Storage Area Network Associated Data Library, filed Dec. 28, 2001 and issued as U.S. Pat. No. 6,715,031 on Mar. 30, 2004; and Ser. No. 10/034,083 entitled System and Method for Managing a Moveable Media Library with Library Partitions, filed Dec. 28, 2001; the disclosures of which are hereby incorporated herein by reference.

BACKGROUND OF THE INVENTION

1. Technical Field

The present invention is in general related to mass data storage and more specifically to a system and method for intermediating communication, with a moveable media library, utilizing a plurality of partitions 2. Background Digital magnetic tape is commonly used for long-term data storage in computer systems. The low cost-per-bit stored, long-term retention capability, and portability of magnetic tape cartridges have made magnetic tape the medium of choice for storing the large quantities of data generated by businesses such as insurance companies, banking organizations, airlines, and the like.

Tape cartridges are frequently utilized by automated tape library peripherals. Tape libraries generally handle numerous tape cartridges to store very large amounts of data. The tape libraries hold the tape cartridges in predefined positions or media slots. When content is required from a particular tape cartridge, a host system communicatively coupled to the tape library communicates with a robotics subsystem controller of the tape library. The host system may be communicatively coupled to the tape library by a number of mechanisms. For example, the host system may be communicatively coupled to the tape library via a Small Computer System Interface (SCSI) bus or a Fibre Channel (FC) fabric. The host system may communicate a command to the robotics subsystem controller to retrieve the particular tape cartridge from the respective position or media slot. In response, the robotics subsystem controller may execute various mechanical operations by robotic mechanics to retrieve the desired tape cartridge and place the desired tape cartridge into a tape drive. The host system may then read from or write to the tape cartridge via the tape drive.

Additionally, other communication may occur between the host system and the robotics subsystem controller. For example, the host system may query the robotics subsystem controller to determine the number of tape cartridges, tape drives, and robotics mechanisms contained in the tape library. By querying the robotics subsystem controller in this manner, the host system may manage the tape library.

Although tape libraries are useful for providing a significant amount of long-term data storage capacity, tape libraries possess several disadvantages. For example, the data storage capacity may be allocated for use by several entities. Accordingly, all of the data storage capacity may be accessible by each host system or entity communicatively coupled to the tape library. To address this problem, partitioning has been utilized. Partitioning involves assigning specific tape library resources (e.g., various slots, tape drives, robotic mechanics) to discrete virtual devices. Access to the virtual devices is then restricted as desired for particular applications.

Different approaches may be utilized to partition a tape library. First, host system restrictions have been utilized to restrict access to portions of a tape library for partitioning applications. Such host restrictions are implemented by a mediating software process on a host system to enforce partition restrictions. However, this approach is problematic. Specifically, the approach is undesirable if the tape library is utilized in a storage service provider environment. In storage service provider environments, the tape library and the host systems belong to different entities (e.g., the storage service provider and the customers). Placement of software mediating processes on host systems is unattractive, because it increases the burden on the customers to make use of the storage service. Also, corporate environments impose relatively long qualification cycles for new host system software. Moreover, many customers are unwilling to allow other parties to place software on their host systems. Additionally, the software mediating process approach is typically incompatible with existing data back-up utilities, i.e., the software mediating process approach requires the use of specialized data back-up applications.

A second approach, used by Spectra Logic, provides multiple bridge devices to partition tape libraries into multiple virtual devices. Each bridge device includes Quad Interface Processors (QIPs) to implement partitioning. The QIPs are processor-based card devices that serve as the sole interface between a host system and a library. By configuring each of the QIPs via a software interface, the QIPs are capable of emulating several virtual libraries that appear to be multiple physical libraries to a host system or host systems. Each QIP in the library can only support one partition. Also, this architecture requires that all drives in a partition to share one SCSI bus with a host, thereby resulting in potential bottlenecks.

Although this architecture does provide a mechanism to implement partitioning in a manner that is somewhat transparent to host systems, this architecture is problematic. Specifically, it is costly and hardware-intensive in that it requires multiple processor-based cards. Second, the use of multiple hardware bridges introduces multiple points of failure, thereby increasing the probability that data may become inaccessible. Moreover, this hardware approach rigidly controls the addition of further resources to a given partition. There is a specific structural relationship between the bridging hardware and the addition of further resources to a partition. Accordingly, the hardware approach is not amenable to the creation of multiple smaller partitions or applicable to partitioning smaller tape libraries.

BRIEF SUMMARY OF THE INVENTION

In an embodiment, the present invention is directed to a system for intermediating communication, with a moveable media library, utilizing partitions, wherein the moveable media library comprises an internal controller that is, in part, operable to control a robotics subsystem in response to commands received via a control interface. Such a system comprises: a bridge unit that is operable to pass library commands to an external controller, wherein the bridge unit is operable to associate a plurality of logic units (LUNs) with the external controller. The external controller is operable to process library commands from the bridge unit, wherein the external controller associates each partition of a plurality of partitions with a respective LUN of the plurality of LUNs, and the external controller is further operable to translate received commands from the bridge unit for communication to the internal controller according to the plurality of partitions.

BRIEF DESCRIPTION OF THE DRAWINGS

FIG. 2 depicts an exemplary table to define a partitioning scheme according to embodiments of the present invention.

FIG. 3 depicts an exemplary permissions table to implement secure partitioning according to embodiments of the present invention.

FIG. 4 depicts the system shown in FIG. 1 in a storage area network according to embodiments of the present invention.

DETAILED DESCRIPTION OF THE INVENTION

The present invention is directed to systems and methods for partitioning the resources of a moveable media library. Specifically, bridge units, an external controller, and a partitioning management controller are utilized as intermediary elements to partition an existing library that does not otherwise support partitioning. Embodiments of the present invention utilize the bridge units to control communication between the external controller and host systems and communication between media drives of the library and host systems. The bridge units prevent or enable communication according to a defined partitioning scheme. Moreover, the external controller receives commands associated with partitions. The external controller translates the commands according to the defined partitioning scheme. For example, the external controller may perform element renumbering to make the partitioning scheme appear transparent. The external controller then passes the translated commands to the internal controller of the library. The partitioning management controller may be utilized to receive user input to define the partitioning scheme. The partitioning management controller utilizes the received input to configure the bridge units and the external controller to implement the partitioning scheme.

Utilizing an external controller to partition the resources of a storage library provides several advantages. First, the use of an external controller enables the large storage capacity of a storage library to be shared among several entities or organizations. By doing so, multiple entities or organizations that require moderate storage capacity may receive the benefit of reduced storage costs that mass storage libraries provide. Additionally, utilizing an external controller causes the partitioning scheme to be transparent to host systems accessing the stored data. Specifically, the host systems do not require specialized software and the host systems are not required to possess any knowledge of the other partitions. Specifically, the partitioning system may be implemented in a manner where an individual host system is only capable of accessing its own subset of resources of the storage library.

Figure 1:
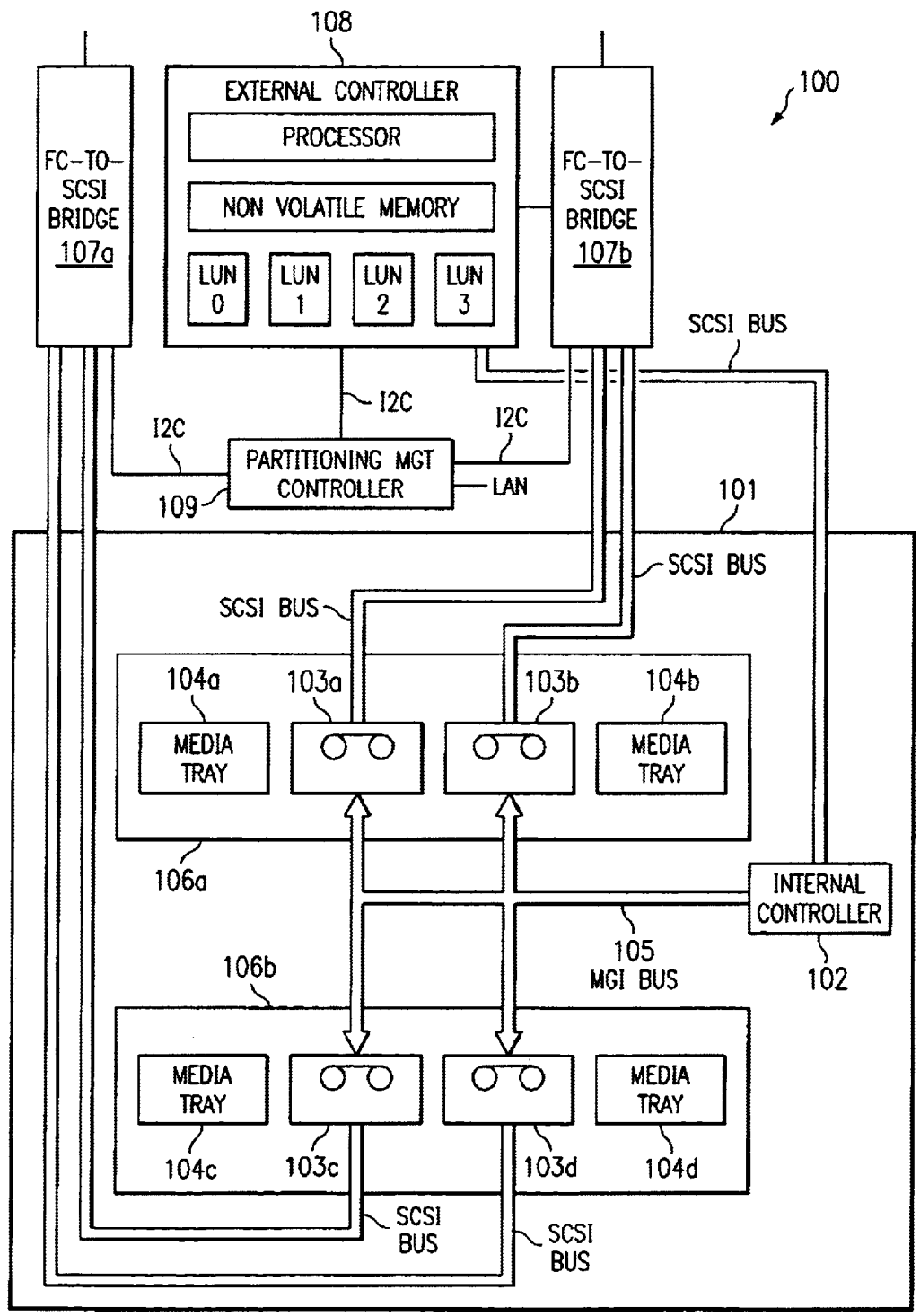
FIG. 1 depicts an exemplary system that enables partitioning of a existing tape library according to embodiments of the present invention.

FIG. 1 depicts a block diagram of exemplary system 100 that comprises external controller 108 according to embodiments of the present invention. System 100 comprises tape library 101. Tape library 101 is an ordinary Small Computer System Interface (SCSI) tape library as is known in the art. It shall be appreciated that tape library 101 does not, by itself, support partitioning. Specifically, any host system or host systems coupled to the SCSI buses of tape library 101 may access any portion of tape library 101 associated with the respective buses.

To aid the reader's understanding of embodiments of the present invention, the operations of tape library 101 will be briefly discussed. First, internal controller 102 is the typical controller unit that is used to access tape library 101 by a host system or host systems. Internal controller 102 processes commands received from host systems to control the operations of tape library 101 via management bus 105. For example, internal controller 102 may receive a "Read Element Status" command from a host system. In response, internal controller 102 may respond by identifying all elements in tape library 101. After the host system determines the elements of tape library 101, the host system may issue a command to internal controller 102 to retrieve a particular tape cartridge from one of the media slots of the tape library 101. The media slots may be arranged in media trays 104a through 104d. In response, internal controller 102 may communicate with a robotics subsystem (not shown) to place the tape cartridge in one of tape drives 103a through 103d. The robotics subsystem may perform the mechanical operations of retrieving the particular tape cartridge from a slot of media trays 104a through 104d and placing the particular tape cartridge into one of tape drives 103a through 103d.

Tape library 101 further comprises a plurality of SCSI buses to communicate with external systems. Tape drives 103a through 103b are preferably communicatively coupled to a respective SCSI bus to avoid creating a communications bottleneck. After a tape cartridge has been placed in one of tape drives 103a through 103d, a host system may initiate data transfers by communicating directly with the respective tape drive 103. Specifically, the tape commands and data transfers may be communicated over the tape drive's SCSI bus and do not necessarily involve internal controller 102.

Without external controller 108, partitioning management controller 109, and Fibre Channel (FC)-to-Small Computer System Interface (SCSI) bridges 107a and 107b implemented in accordance with embodiments of the present invention, tape library 101 is operable to respond to any host system or host systems communicatively coupled to the respective SCSI buses. However, a configuration lacking elements 107a, 107b, 108, and 109 is problematic. Specifically, if two or more independent organizations were to share the data storage capacity of tape library 101, access to mission-critical data of one organization by the another organization could be disastrous. Trade secrets could be revealed or data necessary for daily operations could be damaged.

Accordingly, external controller 108, partitioning management controller 109, and FC-to-SCSI bridges 107a and 107b are preferably utilized to partition the resources of tape library 101. By partitioning the resources, multiple libraries may be "seen" by a host system or host systems. Additionally, the partitioning scheme may be enforced by enabling only authorized host systems to access respective partitions to ensure the integrity of the stored data. Specifically, the SCSI buses associated with tape drives 103a through 103d are coupled to FC-to-SCSI bridges 107a and 107b. Moreover, external controller 108 is coupled to FC-to-SCSI bridge 107b. Accordingly, FC-to-SCSI bridges 107a and 107b are operable to prevent unauthorized host systems from communicating with tape drives 103a through 103b and external controller 108 as will be discussed in greater detail below.

To configure the partitioning scheme, system 100 may comprise partitioning management controller 109 as disclosed in U.S. patent application Ser. No. 10/033,009 entitled "SYSTEM AND METHOD FOR PARTITIONING A STORAGE AREA NETWORK ASSOCIATED DATA LIBRARY EMPLOYING ELEMENT ADDRESSES." Partitioning management controller 109 may be communicatively coupled to a local area network (LAN) or other communication network. Partitioning management controller 109 may be coupled to FC-to-SCSI bridges 107a and 107b and external controller 108 via any suitable management bus such as the I2C (Inter-Integrated Circuit) bus. Additionally, partitioning management controller 109 may comprise an embedded web server to enable a system administrator to configure or partition system 100 from a secure host system. The web server may provide a user interface to enable the system administrator to create a partition, delete a partition, assign resources to a partition, and define permissions applicable to a partition. Modifications to the partition scheme are preferably presented to a user graphically via the web server interface. Additionally, the web server may preferably enable a user to download a particular partition configuration to the user's system. The user may then reload the partition configuration at a later time. Additionally or alternatively to providing a web server, partitioning management controller 109 may receive commands (via a suitable network management protocol) to configure the partitioning scheme.

To enhance the security of the partitioning scheme, partitioning management controller 109 may preferably not enable modifications to a partition if one of tape drives 103a through 103d is loaded with a tape affected by the partition modification. Partitioning management controller 109 also preferably detects whether the SCSI address of any device is changed. If so, partitioning management controller 109 may reconfigure various devices according to the defined partitioning scheme.

Moreover, it is advantageous to cause the configuration communication to occur "out-of-band," i.e., the configuration communication preferably occurs over a separate medium than the communication associated with data storage and retrieval. By placing the configuration communication out-of-band, the partitioning scheme cannot be subverted by a host system coupled to system 100 via FC-to-SCSI bridges 107a and 107b. Additionally or alternatively, system 100 may include a manual user interface (not shown) to provide partitioning information to partitioning management controller 109.

In a storage provider environment, the resources of system 100 are managed by a storage provider. The data storage capacity is sold as a service to customers of the storage provider. In such an environment, partitioning management controller 109 may implement additional functionality to provide instant capacity on demand as disclosed in U.S. patent application Ser. No. 10/034,691 issued as U.S. Pat. No. 6,715,031, entitled "SYSTEM AND METHOD FOR PARTITIONING A STORAGE AREA NETWORK ASSOCIATED DATA LIBRARY." In such an environment, a storage customer may pay for a given amount of storage capacity. When a customer requests extension or modification of the customer's partition, partitioning management controller 109 may verify that the customer has obtained a license for such additional library resources. For example, the customer may pay for a license that permits a maximum number of tape drives 103 and/or tape cartridges. Any partition extension request may be examined to determine whether the maximum number would be exceeded by performing the extension. Management controller 109 may either reject or enable the partition extension as appropriate. Moreover, it may be advantageous to cause certain resources to be reserved for future expansion by a specific customer. These resources may be disabled until the customer actually requires the resources and pays for their use.

To assign resources to a partition by using, for example, partitioning management controller 109, system resource table 201 may be utilized as depicted in FIG. 2. System resource table 201 may be stored in non-volatile memory (e.g., EEPROM) accessible by partitioning management controller 109. System resource table 201 respectively may assign tape drive 103a to partition 1, tape drive 103b to partition 2, tape drive 103c to partition 3, and tape drive 103d to partition 4 via the tape_drive_1, tape_drive_2, tape_drive_3, and tape_drive_4 records. Additionally, tape cartridges (that are stored in slots of media trays 104a through 104d) may be assigned to partitions 1, 2, 3, and 4 in groups of 10 tape cartridges. For example, tapes 1–10 may be assigned to partition 1, tapes 11–20 may be assigned to partition 2, tapes 21–30 may be assigned to partition 3, and tapes 31–40 may be assigned to partition 4. It shall be appreciated that system resource table 201 is depicted in diagram form in FIG. 2. However, the representation of system resource table 201 is not limited to this format. Any suitable data structure (a table, an array, a file, an instantiated object of a class, and/or the like) may be utilized to implement system resource table 201.

It shall be appreciated that all resources of a tape library need not be assigned at a particular time. It may be advantageous to leave certain resources unassigned or disabled. When an organization determines that it requires additional data storage capacity, its partition may be enlarged to encompass some of the unassigned resources.

It shall be also appreciated that system resource table 201 is merely exemplary. Other assignment configurations may be utilized. In one embodiment, tape cartridges may be assigned to partitions in groups of 10, i.e., one or several media trays 104 are added to or deleted from a partition. The groups need not be contiguous. For example, media trays 104a and 104d may be assigned to the same partition. Preferably, no more than one tape drive of tape drives 103a through 103d is assigned per ten tape cartridges assigned to a given partition. It shall be appreciated that this design preference is selected to increase operating efficiency. However, it shall be further appreciated that the present invention does not require this design preference or any other specific allocation of resources to the partitions.

In another embodiment, a greater degree of control may be applied to partitioning operations to ensure compatibility with software back-up operations. In an embodiment, the various components of tape library 101 are organized into levels (e.g., levels 106a and 106b shown in FIG. 1). Each level comprises two media trays 104 and two tape drives 103. The levels may then be assigned in a manner that is compatible with other commercially-available tape libraries. For example, Hewlett-Packard Company SURESTORE 1/9™ tape library utilizes nine tape slots. System 100 may be configured such that level 106a is made to appear to a host system or host systems as comprising at least two Hewlett-Packard Company SURESTORE 1/9™ tape libraries. To ensure compatibility with software back-up applications that utilize SURESTORE 1/9™ tape libraries, one partition should comprise the resources associated with the "left" side of level 106a (i.e., media tray 104a and tape drive 103a). The other partition should comprise the resources associated with the "right" side of level 106a (i.e., media tray 104b and tape drive 103b). By assigning resources in this manner, partitions will not share the same trays or drives. Accordingly, conflicts in commands will be reduced. Commands to each partition will only need to be queued until the robotics subsystem completes various mechanical operations. Commands need not be delayed due to data transfers to and from the tape cartridges.

Similar partitioning schemes may be utilized to cause partitions to emulate other tape libraries. For example, an entire level (e.g., level 106b) may be allocated to one partition to emulate the operations of HP SURESTORE 2/20™ (a tape library that includes two tape drives and twenty tape cartridges).

The configuration schemes described herein are dependent on a tape library architecture similar to the architecture depicted in FIG. 1. Tape libraries that utilize other configurations may be partitioned to emulate multiple virtual tape libraries according to embodiments of the present invention. The particular architecture of a selected tape library may influence the partitioning scheme.

It shall be appreciated that the partitioning scheme may be configured to emulate at least two different tape library devices. For example, external controller 108 may be configured such that logical unit (LUN) 0 emulates a SURESTORE1/9™ while LUN 1 emulates a SURESTORE 2/20™. A portion of level 106a may be allocated to the partition associated with emulation of the SURESTORE 1/9™ device. Library resources associated with level 106b may be allocated to the partition associated with emulation of the SURESTORE 2/20™. Additionally, external controller 108 preferably responds appropriately to SCSI inquiry commands addressed to each LUN. For LUN 0, external controller 108 may return the vendor ID, product ID, firmware revision, and vendor specific information defined by the SURESTORE 1/9™ device. Likewise, for LUN 1, external controller 108 may return the vendor ID, product ID, firmware revision, and vendor specific information defined by the SURESTORE 2/20™ device.

The user interface associated with partitioning management controller 109 may be utilized to control access to various partitions. For example, permissions table 301 may be created via the user interface. Permissions table 301 lists the authorized host systems for each of partitions 1, 2, 3, and 4. The authorized host systems are identified by Fibre Channel World Wide Name (WWNs) (e.g. WWN-1, WWN-2, WWN-3, WWN-4, WWN-5 and WWN-6, in FIG. 3). Other communication protocol addresses or identifiers may be utilized in combination with or in lieu thereof. Permissions table 301 may be stored in non-volatile memory (e.g., EEPROM) in a location that is accessible to partitioning management controller 109.

Partitioning management controller 109 preferably utilizes the information received from the user interface to control or configure external controller 108 and FC-to-SCSI bridges 107a and 107b. Additionally, partitioning management controller 109 preferably detects any firmware changes to external controller 108. In the event that a modification to the firmware is detected, partitioning management controller 109 preferably reconfigures external controller 108 according to the defined partitioning scheme. By controlling or configuring the elements, the partitioning scheme may be enforced as will be discussed in greater detail below.

External controller 108 preferably utilizes the configuration information received from partitioning management controller 109 to virtualize or emulate multiple instances of internal controller 102 as disclosed in U.S. patent application Ser. No. 10/033,009 entitled "SYSTEM AND METHOD FOR PARTITIONING A STORAGE AREA NETWORK ASSOCIATED DATA LIBRARY EMPLOYING ELEMENT ADDRESSES." As previously noted, system resource table 20 of the illustrative embodiment defines four partitions. Accordingly, external controller 108 may associate the four LUNs (0, 1, 2, and 3) with the respective partitions (e.g., LUN 0 corresponds to partition 1, LUN 1 corresponds to partition 2, LUN 2 corresponds to partition 3, and LUN 3 corresponds to partition 4). External controller 108 may be operable to process a command active on each individual LUN (external controller 108 may properly support disconnects). Additionally, external controller 108 may be operable to maintain the state of each "virtual" controller associated with each LUN to, for example, respond to various commands including Test Unit Ready and Request Sense, Mode pages, Log pages, and the like.

External controller 108 receives commands from a host system or host systems. External controller 108 translates the commands according to the partitioning scheme. External controller 108 then passes the translated command to internal controller 102 if the command is valid, i.e., it references a proper element (e.g., tape cartridge) of the respective partition. External controller 108 receives a response message (if any) from internal controller 102. External controller 108 translates the response message and forwards the translated response message to the originating host system.

For example, a host system may send a "Read Element Status" command to LUN 3. External controller 108 determines the respective partition by reference to the identified LUN (partition 4 is associated with LUN 3). External controller 108 may submit a "Read Element Status" command to internal controller 102. Internal controller 102 generates a response that identifies all elements of tape library 101 and communicates the response to external controller 108. After receiving the response information from internal controller 102, external controller 108 removes all information that does not pertain to partition 4. Additionally, external controller 108 may renumber the identified library elements. For example, external controller 108 may renumber tape cartridges 31–40 physical drive 103d as virtual tape cartridges 1–10 associated with the virtual drive of LUN 3. External controller 102 then forwards the response to the originating host system.

As another example, a host system may send a command to LUN 3 to have virtual tape cartridge 3 placed into virtual tape drive 4. Assuming that it is authorized, external controller 108 translates the virtual elements into physical elements. External controller 108 sends a command to internal controller 102 to place tape cartridge 33 into tape drive 103d. When internal controller 102 sends a response message indicating that the operation has been completed, external controller 102 sends the response message to the originating host system.

In the event that multiple commands are received from host systems that require the same library resource, external controller 102 may queue the commands on a first in, first executed basis. For example, a command to retrieve a tape cartridge may be required to be queued while a robotics subsystem completes placement of another tape cartridge into one of tape drives 103a through 103d. Other queuing techniques (such as defining a priority scheme) may be utilized if desired.

External controller 108 may be implemented utilizing any suitable processor such as a STRONGARM processor, a MIPS processor, or the like. External controller 108 may further comprise non-volatile memory (PROM, EPROM, EEPROM, and/or the like). The non-volatile memory may comprise executable code for performing the operations of external controller 108. The non-volatile memory may further store partitioning information received from partitioning management controller 109. To support queuing of commands addressed to the multiple instances of external controller 102, a relatively larger buffer may be provided to external controller 102. Moreover, as shown in FIG. 1, external controller 108 communicates with internal controller 102 via a SCSI interface. Accordingly, external controller 108 may comprise a SCSI initiator. In alternative embodiments, external controller 108 may be communicatively coupled to internal controller 102 via a serial interface or other suitable interface.

It shall be appreciated that external controller 108 is depicted as being disposed behind FC-to-SCSI bridge 107b. Accordingly, external controller 108 is coupled to a SCSI bus. Accordingly, external controller 108 does not, pursuant to the SCSI protocol, receive information that identifies the origin of received SCSI commands. External controller 108 merely "sees" the SCSI messages as originating from a respective LUN associated with the respective SCSI bus coupled to FC-to-SCSI bridges 107b.

Accordingly, as previously noted, partitioning management controller 109 preferably utilizes the information received from the user interface to control or configure FC-to-SCSI bridge 107b to enforce the partitioning scheme. Specifically, partitioning management controller 109 may transfer the information contained in system resource table 201 and permissions table 301 to FC-to-SCSI bridge 107b. Using the received information, FC-to-SCSI bridges 107b may prevent unauthorized host systems from communicating with a LUN associated with external controller 108 or tape drives 103a through 103d. Specifically, FC-to-SCSI bridge 107b may not bridge or route messages to the respective SCSI buses from unauthorized host systems. By doing so, unauthorized host systems are incapable of initiating data transfers associated with various partitions of system 100. Moreover, unauthorized systems are unable to discover the presence of library elements through device discovery protocols.

In preferred embodiments, FC-to-SCSI bridges 107a and 107b, external controller 108, and partitioning management controller 109 are preferably implemented such that partitioning is persistent between power cycles. Each of the elements may utilize non-volatile memory to retrieve information defining the partitioning scheme. These elements will not enable tape operations to occur until the elements are properly configured with information stored in non-volatile memory. Additionally, these elements preferably respond dynamically to configuration information and do not require a power cycle to alter the partitioning scheme.

To illustrate a preferred embodiment of the present invention, reference is now made to FIG. 4. FIG. 4 depicts system 400. System 400 comprises host systems 403-1 through 403-4 that facilitate access to data stored on storage area network (SAN) 407. SAN 407 comprises SAN fabric 401, storage devices 402-1 and 402-2, and system 100. Storage devices 402-1 and 402-2 may be any type of suitable storage device including disk arrays, JBODs (just a bunch of disks), optical media players, and/or the like. In exemplary system 400, host systems 403-1 through 403-4 may dynamically store and retrieve information from storage devices 402-1 and 402-2. Host systems 403-1 through 403-4 may execute back-up utility applications to back-up data stored on storage devices 402-1 and 402-2 on system 100. Alternatively, back-up operations may occur via data mover applications as will be discussed in greater detail below.

The type of configuration depicted in FIG. 4 is referred to as a storage area network for several reasons. First, the data transfers or communication related to data storage is preferably isolated from communication between host systems 403-1 through 403-4 and clients 406-1 through 406-M. Secondly, there is preferably no single point of failure within SAN 407. SAN fabric 401 preferably provides redundant connections via hubs, switches, routers, and/or the like. Additionally, multiple host systems (e.g., 403-1 through 403-4) are preferably utilized.

SAN fabric 401 provides a communication fabric to facilitate communication among system 100, storage devices 402-1 and 402-2, and host systems 403-1 through 403-4. SAN fabric 401 is typically implemented utilizing a Fibre Channel architecture. Fibre Channel is typically utilized due to the simplicity of its communication path, i.e., Fibre Channel utilizes a serial communication scheme. Additionally, Fibre Channel provides data communication at relatively high rates (e.g., 1064 Mbps) over either copper and/or optical fiber cables. Data communication rates may over Fibre Channel media may increase in accordance with further technological developments. Copper cables are generally utilized when various storage devices 402 are separated from host systems 403-1 through 403-4 by intra-cabinet connections. Optical cables may support separation distances up to 500 meters from a device to a hub (a Fibre Channel interconnection unit within SAN fabric 401) and up to 10 kilometers between hubs. Fibre Channel further utilizes various communication topologies such as point-to-point, arbitrated loop, and star topologies. Fibre Channel also encapsulates or supports various communication protocols such as SCSI and Internet Protocol (IP) protocols. Devices that do not support Fibre Channel can be coupled to a Fibre Channel fabric via a bridge device. Specifically, numerous commercially-available bridge devices (such as Hewlett-Packard Company SURESTORE SCSI BRIDGE FC 4/1™, enable a SCSI device to be deployed on a SAN that employs a Fibre Channel fabric. Although Fibre Channel is typically utilized for SAN fabric 401, other communication mechanisms may be utilized. For example, it is frequently appropriate to perform remote mirroring operations to redundantly store mission-critical data at remote locations. For such operations, asynchronous transfer mode (ATM) network elements or leased-lines (T-1, OC-12, and/or the like) may be employed.

Clients 406-1 through 406-M may communicate with host systems 403-1 through 403-4 via communication network 405. Communication network 405 may comprise any number of communication media, such as ATM, wireless, and/or leased-line links. By communicating with host systems 403-1 through 403-4, clients 406-1 through 406-M may obtain data stored on the SAN 407. For example, clients 406-1 through 406-M may possess operating systems that are configured to access network drives through host systems 403-1 through 403-4. The network drives implemented by host systems 403-1 through 403-4 may manage various files on storage devices 402-1 and 402-2 and system 100.

The configuration utilized by storage area networks is quite advantageous. First, the storage is placed behind host systems 403-1 through 403-4. Data transfers, for example, between system 100 and host systems 403-1 through 403-4 do not occur over the same communication network as data transfers between host systems 403-1 through 403-4 and clients 406-1 through 406-M. By placing the data transfers associated with stored data behind host systems 403-1 through 403-4, overall system performance can be significantly enhanced. Moreover, the configuration of SAN 407 is robust in that the probability of failure is greatly minimized, because there is no single point of failure. Additionally, numerous additional data storage devices 402 or systems 100 may be added to system 400 without appreciable difficulty by coupling respective devices to SAN fabric 401. Accordingly, SAN 407 is advantageously scalable. It shall be appreciated that SAN 407 may be located at any location, i.e., it is not required to be located on the premises of an organization that utilizes its storage capacity. Additionally, SAN 407 may be advantageously managed by a separate entity from the organizations that utilize its storage capacity.

FC-to-SCSI bridges 107a and 107b preferably restrict access to system 100 according to the partitioning scheme. FC-to-SCSI bridges 107a and 107b may be implemented according to the bridging embodiments disclosed in U.S. Pat. Ser. No. 10/032,662 entitled "SYSTEM AND METHOD FOR MANAGING ACCESS TO MULTIPLE DEVICES IN A PARTITIONED DATA LIBRARY." As previously noted, FC-to-SCSI bridges 107a and 107b receive authorized host information from partitioning management controller 109 by receiving WWNs associated with authorized host systems. It shall be appreciated that Fibre Channel messages are addressed with source IDs and not WWNs. Accordingly, FC-to-SCSI bridges 107a and 107b preferably maintain a source ID-to-WWN table. When a SCSI command is received by one of FC-to-SCSI bridges 107a and 107b, the bridge determines the source ID from the FC message. A table look-up is preferably performed to determine the originating host system WWN. The respective bridge utilizes the information received from partitioning management controller 109 to determine whether the originating host system is authorized to access the device associated with the command. If it is authorized, the command is passed to either external controller 108 or one of tape drives 103a through 103d.

For example, host systems 403-1 through 403-4 determine which devices are communicatively coupled to SAN 407 by performing device discovery. Pursuant to SCSI protocols and the like, host systems 403-1 through 403-4 send a device identification query to each device within a given device range. In accordance with the device protocol, the devices respond by sending various information such as vendor ID, product ID, and firmware revision information. When host systems 403-1 through 403-4 perform device discovery, host systems 403-1 through 403-4 only discover the devices associated with system 100 that are permitted by the partitioning scheme. Specifically, FC-to-SCSI bridges 107a and 107b do not bridge or route a device identification query unless the originating host system is authorized via system resource table 201 and permissions table 301. Accordingly, library resources belonging to one of host systems 403-1 and 403-4 are not exposed to the other host systems.

Additionally, host systems 403-1 through 403-4 respectively discover ones of the multiple instances of external controller 108 according to the partitioning scheme. Host systems 403-1 through 403-4 may see the LUNs (0, 1, 2, and 3) behind FC-to-SCSI bridges 107b depending on the partitioning scheme. Each LUN pursuant to the suitable device discovery protocol will identify itself as a distinct tape library controller by returning an appropriate vendor ID, product ID, and firmware revision information. Additionally, host systems 403-1 through 403-4 may determine the contents of each virtual tape library or partition by sending a "Read Element Status" or other suitable command to the various LUNs. External controller 108 will respond according to the partitioning scheme by only identifying the elements of the respective partitions. Also, external controller 108 may renumber IDs of physical elements to virtual elements.

As described in greater detail in U.S. Pat. Ser. No. 10/032,662 entitled "SYSTEM AND METHOD FOR MANAGING ACCESS TO MULTIPLE DEVICES IN A PARTITIONED DATA LIBRARY," FC-to-SCSI bridges 107a and 107b may perform LUN renumbering. The view of the LUNs behind FC-to-SCSI bridges 107a and 107b may vary on a per-host system basis. For example, host system 403-1 may only be allowed access to the first partition emulated by external controller 108. Accordingly, FC-to-SCSI bridges 107b may renumber the LUNs visible to host system 403-1 so that only one LUN is associated with a library controller device. Accordingly, resources associated with other partitions may be hidden from host system 403-1. Additionally, FC-to-SCSI bridges 107a and 107b may preferably perfonn LUN renumbering such that each host system 403-1 through 403-4 sees a continuous series of LUNs on each SCSI bus with each series beginning with 0. Specifically, this process facilitates compatibility with various operating systems.

After obtaining device identification information, host systems 403-1 through 403-4 may issue commands to initiate data transfers to or from the tape cartridges in their respective partitions. For example, certain commands may be sent to the respective LUN of external controller 108. External controller 108 may translate the command into the appropriate form for internal controller 102 (e.g., performing device or element renumbering). After queuing the command (if necessary), external controller 108 may send the command to internal controller 102. After the operation associated with the command is complete, external controller 108 receives a response from internal controller 102. External controller 108 then sends a response to the originating host system of host systems 403-1 through 403-4.

In embodiments of the present invention, data mover functionality is preferably implemented in system 400. Data mover functionality refers to the capability of performing a data transfer from one storage device to another storage device without appreciably utilizing the processing capacity of a host system. For example, host system 403-1 may send a data mover command to a virtual tape drive of system 100 in its partition. The command may identify another storage device (e.g., storage device 402-1) and a file, for example.

In response, the virtual tape communicates with the storage device to transfer the file to its tape cartridge. However, it shall be appreciated that enabling a physical tape drive to perform this functionality is problematic. For example, SCSI devices cannot directly communicate with Fibre Channel disk arrays.

Accordingly, FC-to-SCSI bridges 107a and 107b preferably implement data mover functionality. As described in greater detail in U.S. patent application Ser. No. 10/032,923 entitled "SYSTEM AND METHOD FOR PERIPHERAL DEVICE VIRTUAL FUNCTIONALITY OVERLAY," FC-to-SCSI bridges 107a and 107b may respond to peripheral-to-peripheral data mover commands. For example, the data movers may be implemented to be addressed as separate entities (e.g., Fibre Channel LUNs). If the data movers are addressed by separate Fibre Channel LUNs, the data movers should be added to respective partitions to enable their use by host systems 403-1 through 403-4. Respective partitions to enable their use by host systems 403-1 through 403-4. By adding the data movers to partitions, the security of the partitioning scheme may be maintained.

Alternatively, FC-to-SCSI bridges 107a and 107b may "overlay" data mover functionality on tape drives 103a through 103d. This may be implemented as a "data move" (standardized as "XCOPY") SCSI command. The command would be addressed to the Fibre Channel LUN mapped to a tape drive 103 by the respective bridge 107. However, the "data move" command would not be sent to the tape drive 103 by the respective bridge 107. Instead, the respective bridge 107 would intercept the command and would emulate the tape drive 103 by responding to the command. In this implementation, the data movement functionality is secured using the same security settings as the partition in which the tape drive belongs.

Figure 5:
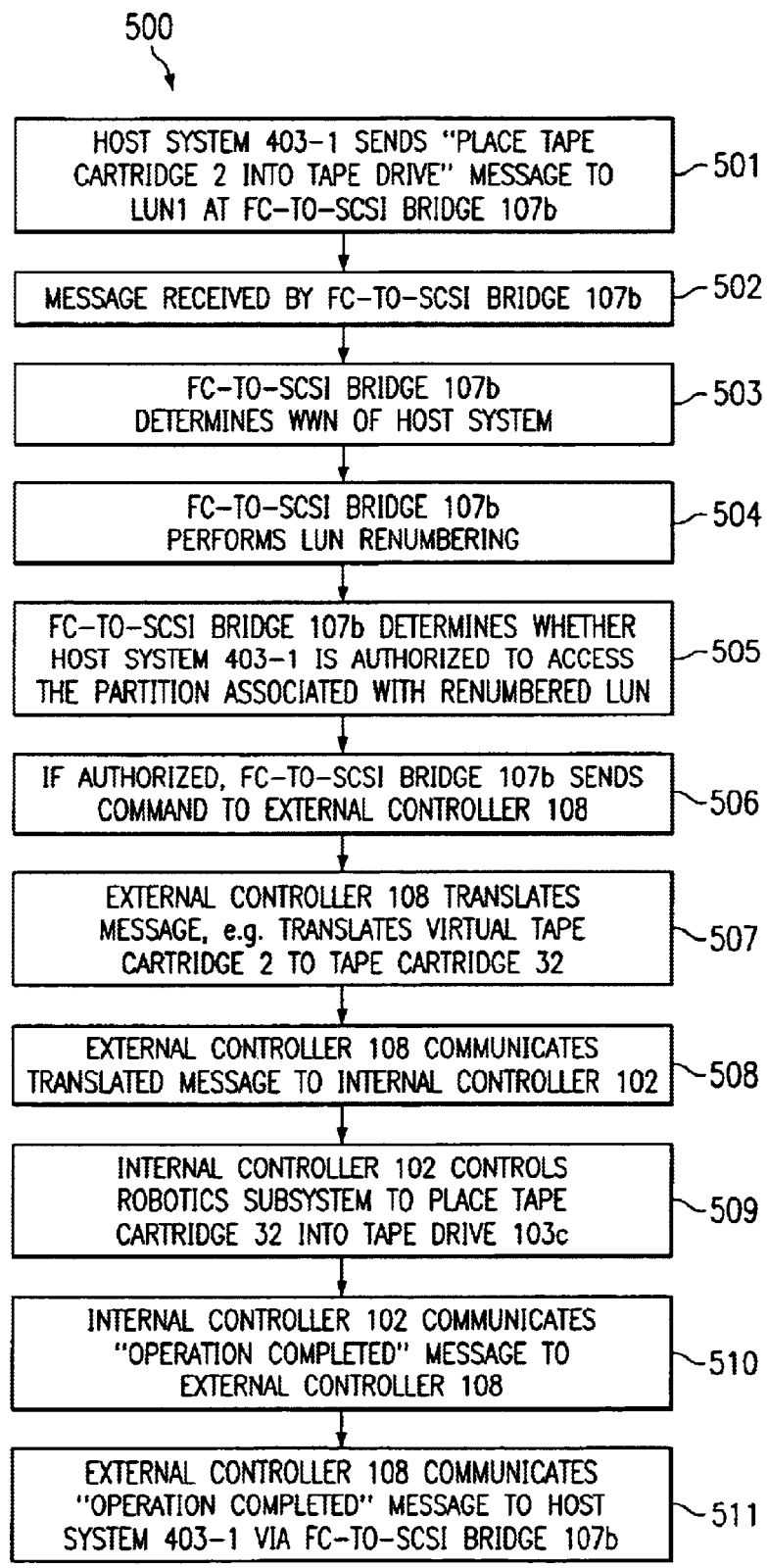
FIG. 5 depicts a process flowchart according to the storage area network shown in FIG. 4.

To illustrate operations of system 100 in a storage area network environment, reference is now made to FIG. 5 that includes flowchart 500. Process flowchart 500 illustrates steps involving components in system 400 of FIG. 4 according to embodiments of the present invention. In step 501, host system 403-1 sends "place tape cartridge 2 into drive" message to LUN 1 of the SCSI bus coupled to external controller 108 and FC-to-SCSI bridge 107b. The message is received by FC-to-SCSI bridge 107b in step 502. FC-to-SCSI bridge 107b determines the WWN of host system 403-1 by examining the source ID of the Fibre Channel message (step 503). FC-to-SCSI bridge 107b uses the determined WWN to perform LUN renumbering (step 504). FC-to-SCSI bridge 107b determines whether host system 403-1 is authorized to access the renumbered LUN of the respective SCSI bus (step 505). If authorized, FC-to-SCSI bridge 107b passes the message to external controller 108 (step 506). External controller 108 translates the message according to the partitioning scheme (e.g., translates virtual tape cartridge 2 into physical tape cartridge 32) in step 507. External controller 108 passes the translated command to internal controller 102 (step 508). In step 509, internal controller 102 controls the robotics subsystem to place tape cartridge 32 into tape drive 103c. Internal controller 102 communicates an "operation completed" message to external controller 108 (step 510). In step 511, external controller 108 communicates an "operation completed" message to host system 403-1 via FC-to-SCSI bridge 107b.

Although embodiments of the present invention have been described utilizing a tape library, it shall be appreciated that the present invention is not so limited. Embodiments of the present invention may be implemented for libraries utilizing any type of moveable media such as CD-ROMs, DVDs, and/or the like.

Although embodiments of the present invention have described partitioning known SCSI tape libraries, the present invention is not so limited. The present invention may partition libraries that designed to attach directly to a Fibre Channel fabric. For such libraries, the present invention may utilize the native Fibre Channel security functionality of the FC sub-components of the library.

Embodiments of the present invention provide numerous advantages. Specifically, embodiments of the present invention enable existing tape libraries to be partitioned to allocate their data storage capacity to various host systems. By doing so, organizations that require moderate storage capacity may receive the benefit of the reduced cost of storage capacity associated with moveable media libraries. Moreover, embodiments of the present invention permit partitioning to occur in a manner that is transparent to host systems. Accordingly, specialized software is preferably not required. Additionally, embodiments of the present invention do not require multiple processor-intensive adapter cards or limit the data transfer capacity of data transfer elements. Embodiments of the present invention also prevent host systems from discovering library resources that belong to other organizations. Similarly, embodiments of the present invention secure resources of the various partitions to prevent unauthorized host systems from accessing library resources that belong to another organization.

What is claimed is:

1. A method for intermediating communication, with a moveable media library, utilizing a plurality of partitions, comprising:

providing a bridge unit to pass commands to an external controller, wherein said bridge unit is operable to associate a plurality of logic units (LUNs) with said external controller;

associating each of said plurality of partitions to one of said plurality of LUNs;

receiving a library command at said bridge unit from a host system;

passing said library command to said external controller; and translating said library command to a command for an internal controller according to said plurality of partitions, wherein said internal controller is operable to perform library operations associated with said translated command.

2. The method of claim 1 further comprising:

creating said plurality of partitions, wherein resources of said moveable media library are assigned to partitions of said plurality of partitions.

3. The method of claim 1 wherein said receiving a command at said bridge unit, comprises determining a Fibre Channel World Wide Name (WWN) of said host system.

4. The method of claim 1 wherein said passing said library command to said external controller comprises determining a LUN of said plurality of LUNs associated with said library command.

5. The method of claim 4 wherein said passing said library command to said external controller comprises determining whether said host system is authorized to access said LUN.

6. The method of claim 4 further comprising passing, by said bridge unit, said library command to said external controller via said determined LUN.

7. The method of claim 4 wherein said library command identifies a virtual device and said external controller determines a physical device corresponding to said virtual device according to the respective partition of said determined LUN.

8. The method of claim 1 wherein said library command is a read element status command, and said method further comprising:

sending a read element status command to said internal controller;

removing selected library resources identified by a message from internal controller in response to said read element status command;

renumbering remaining library resources; and sending a response message including said renumbered remaining library resources.

9. The method of claim 1 wherein a first command is received by said external controller via a first LUN of said plurality of LUNs and a second command is received by said external controller via a second LUN of said plurality of LUNs, and wherein said first command and said second command require a common library resource said method further comprising:

queuing one command of said first command and said second command, until the other command is completed.

10. The method of claim 1 wherein said external controller emulates a virtual moveable library controller for each of said plurality of LUNs.

11. A system for intermediating communication, with a moveable media library, utilizing partitions, wherein said moveable media library comprises an internal controller that is, in part, operable to control a robotics subsystem in response to commands received via a control interface, said system comprising:

a bridge unit that is operable to pass library commands to an external controller, wherein said bridge unit is operable to associate a plurality of logic units (LUNs) with said external controller; and said external controller that is operable to process library commands from said bridge unit, wherein said external controller associates each partition of a plurality of partitions with a respective LUN of said plurality of LUNs, and said external controller is further operable to translate received commands from said bridge unit for communication to said internal controller according to said plurality of partitions.

12. The system of claim 11 wherein said bridge unit is a Fibre Channel (FC) to Small Computer System Interface (SCSI) bridge.

13. The system of claim 11 wherein said bridge unit is operable to determine a World Wide Name (WWN) of a host system in response to receiving a library command from said host system.

14. The system of claim 13 wherein said bridge unit is operable to determine a LUN of said plurality of LUNs for communicating said library command to said external controller utilizing, in part, said determined WWN.

15. The system of claim 11 wherein said external controller is operable to renumber virtual elements into physical elements before passing a command to said internal controller.

16. The system of claim 11 wherein said external controller is operable to remove identification of library resources that do not belong to a partition of said plurality of partitions in response to an identification query command associated with said partition.

17. The system of claim 11 wherein said external controller is operable to queue a first command while waiting for said internal controller is complete operations associated with a second command when said first command and said second command require a common library resource.

18. A system for intermediating communication, with a tape library, utilizing partitions, wherein said tape library comprises an internal controller that is, in part, operable to control a robotics subsystem in response to received commands, said system comprising:

means for bridging communication from a communication fabric to an external controller means, wherein said means for bridging is operable to associate a plurality of logic units (LUNs) with said external controller means; and said external controller means for processing library commands from said bridge unit, wherein said external controller means associates each partition of a plurality of partitions with a respective LUN of said plurality of LUNs, and wherein said external controller means translates received commands from said bridge unit for communication to said internal controller via according to said plurality of partitions.

19. The system of claim 18 wherein said fabric is a Fibre Channel fabric.

20. The system of claim 18 wherein said means for bridging communication is a Fibre Channel-to-Small Computer System Interface bridge.

21. The system of claim 18 wherein said external controller means is operable to translate virtual library elements to physical library elements.

* * * * *